United States Patent [19]

Yamada et al.

[11] Patent Number: 5,302,631
[45] Date of Patent: Apr. 12, 1994

[54] INK FOR JET PRINTER

[75] Inventors: Yutaka Yamada; Isao Tabayashi, both of Saitama; Sadahiro Inoue, Chiba; Shinji Amaya, Saitama, all of Japan

[73] Assignee: Dainippon Ink and Chemicals, Inc., Tokyo, Japan

[21] Appl. No.: 838,907

[22] Filed: Feb. 21, 1992

[30] Foreign Application Priority Data

Feb. 25, 1991 [JP] Japan ................. 3-030085

[51] Int. Cl.$^5$ ............ C03C 17/32; C08K 5/04; C08L 73/00
[52] U.S. Cl. ..................... 523/160; 524/391; 524/508
[58] Field of Search ............ 523/160, 161; 525/364, 525/391, 508

[56] References Cited

U.S. PATENT DOCUMENTS

| 4,248,636 | 2/1981 | Sasaki et al. | 524/473 |
|---|---|---|---|
| 4,260,531 | 4/1981 | Wachtel et al. | 524/389 |
| 4,334,487 | 6/1982 | Cutler et al. | 524/88 |
| 4,472,537 | 9/1984 | Johnson et al. | 523/160 |
| 4,567,213 | 1/1986 | Bhatia et al. | 523/160 |
| 4,680,058 | 7/1987 | Shimizu et al. | 523/160 |
| 4,880,465 | 4/1989 | Loria et al. | 523/218 |

FOREIGN PATENT DOCUMENTS

| 0162674 | 9/1983 | Japan | 523/161 |
|---|---|---|---|
| 0019676 | 1/1986 | Japan | 523/160 |
| 0174577 | 7/1989 | Japan | 523/161 |

Primary Examiner—Paul R. Michl
Assistant Examiner—Peter Szekely
Attorney, Agent, or Firm—Armstrong, Westerman, Hattori, McLeland & Naughton

[57] ABSTRACT

An ink for jet printer is disclosed, which contains an oil soluble dye, a synthetic resin, and an organic solvent, wherein the synthetic resin contains a terpene-phenol copolymer resin and a styrene-acrylic copolymer resin.

10 Claims, No Drawings

INK FOR JET PRINTER

FIELD OF THE INVENTION

The present invention relates to an ink for jet printer suitable for a jet-printing onto various recording materials. In particular, the present invention relates to an ink for jet printer, which is used at a jet-printing onto a recording material attached with a wax and a recording material coated with a coating composition containing a wax.

BACKGROUND OF THE INVENTION

Printing by a jet printer is a system of jetting an ink from nozzles and attaching the ink onto a recording material and since the nozzles are in a non-contact state with the recording material, good printing can be applied onto a curved surface or a surface having an uneven irregular form.

Various kinds of inks have been proposed as an ink for the jet printer. For example, JP-A-56-49772 proposes an ink containing a styrene-acrylic copolymer resin, a plasticizer, a dye, and a solvent composed of water and an alcohol and having a pH in the range of from 7.5 to 10.5 as an ink having a good adhesion to the surfaces of polyolefins or copolymers thereof, JP-A-60-110770 proposes an ink containing a styrene-acrylic acid copolymer resin having a mol ratio of the styrene monomer to the acrylic acid monomer of from 1 to 4, a dye, an evaporation retardant, and a solvent composed of an alcohol and a ketone. JP-A-62-109870 proposes an ink containing a quaternary ammonium salt as an electrically conductivity imparting agent as an ink which does not erode the metals of coating apparatus and has an excellent adhesion to a recording material attached with a wax (the term "JP-A" as used herein means an "unexamined Japanese patent application").

Also, JP-A-2-276870 proposes an ink containing a resin having a good compatibility with a wax as an ink having an excellent adhesion to a surface containing a wax.

However, the inks disclosed in foregoing JP-A-56-49772 and JP-A-60-110770 show an excellent adhesion to various recording materials but have a problem that spreading of the ink dots and the adhesion thereof are inferior to a recording material attached with a wax and a recording material coated with a coating composition containing a wax.

Also, the ink described in the foregoing JP-A-62-109870 shows an improved adhesion to a recording material attached with a wax but the adhesion is yet insufficient.

Furthermore, the ink described in the foregoing JP-A-2-276870 shows an improved adhesion to a surface containing a wax but has a problem that the adhesion and the abrasion resistance to the untreated surface of glass, a metal, a plastic, etc., are insufficient.

SUMMARY OF THE INVENTION

The object of the present invention is to provide a marking ink for a jet printer having a good jetting stability, being suitably used for jet printing to various recording materials such as glass, metals, plastics, etc., and in particular, showing excellent spreading of the ink dots and adhesion to a recording material attached with a wax and a recording material coated with a coating composition containing a wax.

As the result of various investigations for achieving the foregoing object, the inventors have discovered that in various resins having a good compatibility with a wax, such as terpene-phenol copolymer resins, aliphatic petroleum resins, aromatic petroleum resins, cyclopentadiene series resins, chromaindene resins, styrene resins, rosin, and rosin derivatives (e.g., polymerized rosin and a rosin ester), the use of a terpene-phenol copolymer resin and a styrene-acrylic copolymer resin can provide an ink for a jet printer showing an excellent jetting stability, excellent abrasion resistance and adhesion to various recording materials, and, in particular, showing excellent spreading of the ink dots and adhesion to a recording material attached with a wax and a recording material coated with a coating composition containing a wax.

That is, according to the present invention, there is provided an ink for a jet printer containing an oil soluble dye, a synthetic resin, and an organic solvent, wherein said synthetic resin contains a terpene-phenol copolymer resin and a styrene-acrylic copolymer resin.

DETAILED DESCRIPTION OF THE INVENTION

As the waxes attached onto recording materials or contained in coating compositions being coated on recording material, to which the effect of the present invention is remarkable, there are natural waxes such as an animal wax (shellac wax, etc.), a vegetable wax (carnauba wax, etc.), a mineral wax (montan wax, etc.), a petroleum wax (paraffin wax, microcrystalline wax, etc.), etc., and synthetic waxes such as a synthetic hydrocarbon wax (Fischer-Tropsch wax, low molecular polyethylene wax, etc.), a fatty acid ester wax (polyethylene glycol, stearic acid, etc.), a modified wax (montan derivatives, micro wax derivatives, etc.), an amine or amido wax (acra wax, etc.), etc.

The terpene-phenol copolymer resin for use in this invention is a copolymer of a terpene such as α-pinene, β-pinene, etc., and a phenol such as phenol, bisphenol, etc. The mol ratio of a terpene to a phenol in the copolymer resin can be optionally selected but for obtaining excellent spreading of the ink dot and adhesion to a recording material attached with a wax, the copolymer resin having a larger terpene content than the terpene/phenol mol ratio of 1/1 is used. The terpene/phenol mol ratio is preferably from 6/4 to 9/1, more preferably 6/4 to 7/3. Also, the weight average molecular weight of the terpene-phenol copolymer resin is preferably from 500 to 1,000.

As such terpene-phenol copolymer resins, there are YS Polystars S-145, T-80, T-100, T-115, T-130, T-145, #2110, #2115, and #2130, Mityaces G-125, G-150, etc., (trade names, made by Yasuhara Chemical K. K.), although the copolymer resins for use in this invention are not limited to them. The foregoing resins can be also used as a combination of them.

In regard to the content of the terpene-phenol copolymer resin in the ink composition of the present invention, the ratio of the terpene-phenol resin: the styrene-acrylic copolymer resin is preferably from 1:10 to 2:1, and more preferably from 1:10 to 1:1 by weight ratio in the point of obtaining excellent abrasion resistance and adhesion to a recording material attached with a wax and various recording materials such as metals, plastics, glass, etc.

That is, if the content of the terpene-phenol copolymer resin is less than 1/10 as the ratio thereof to the styrene-acrylic copolymer resin, there is a tendency of not obtaining sufficient spreading of the ink dot and a sufficient adhesion to a recording material attached with a wax, while if the content of the terpene-phenol copolymer resin is too large as compared with the content of the styrene-acrylic copolymer resin, there is a tendency that a sufficient abrasion resistance can not be obtained to various recording materials.

The styrene-acrylic copolymer resin for use in the present invention is a copolymer resin of a styrenic monomer such as styrene, α-methylstyrene, vinyltoluene, etc., and an acrylic monomer such as acrylic acid, methacrylic acid, methyl acrylate, methyl methacrylate, ethyl acrylate, ethyl methacrylate, propyl acrylate, propyl methacrylate, isopropyl acrylate, isopropyl methacrylate, butyl acrylate, butyl methacrylate, amyl acrylate, amyl methacrylate, hexyl acrylate, hexyl methacrylate, 2-hydroxyethyl acrylate, 2-hydroxyethyl methacrylate, 2-hydroxypropyl acrylate, 2-hydroxypropyl methacrylate, etc., and the acid value of the resin is preferably not higher than 120.

The weight average molecular weight of the styrene-acrylic copolymer resin for use in this invention is preferably from 3,000 to 30,000.

Practical examples of the styrene-acrylic copolymer resin for use in the present invention are Joncryl 586 and Joncryl 611 (trade names, made by Johnson Polymer Co.), Himer SBM-100 and Himer SAM-955 (trade names, made by Sanyo Chemical Industries, Ltd.), Nikalite NC-6531 and Nikalite NC-6100 (trade names, made by Nippon Carbide Industries, Co., Inc.), etc., although the copolymer resins being used in this invention are not limited to them. These copolymer resins can be used as a combination thereof.

If the acid value of the styrene-acrylic copolymer resin is over 120, the compatibility of the copolymer resin with the terpene-phenol copolymer resin becomes poor and the jetting stability as well as spreading of the ink dot and the abrasion resistance to various recording materials are reduced.

The content of the styrene-acrylic copolymer resin in the ink composition of the present invention is preferably in the range of from 5 to 30% by weight, preferably from 15 to 20% by weight.

As the oil soluble dye being used in this invention, there are various kinds of dyes such as monoazo dyes, disazo dyes, metal complex salt dyes, anthraquinone dyes, phthalocyanine dyes, triallylmethane dyes, etc., and there is no particular restriction on these dyes but in the case of using the ink for an ink jet printer for an ink jet system called as a continuous system, it is preferred to use metal complex salt dyes, that is, metal-containing dyes. That is, when a metal-containing dye is used as the dye for the ink composition, a proper electrical conductivity can be imparted to the ink for a jet printer of the present invention, whereby stable jetting becomes possible and the adhesion to various recording materials can be more improved with a merit that an electric conductivity imparting agent such as an ionizing salt, etc., which reduces the adhesion of the ink to recording materials may not be used.

Practical examples of such a metal complex salt dye are C.I. Solvent Blacks 22, 23, 27, 29, 34, 43, 47, and 123; C.I. Solvent Yellows 19, 21, 32, 61, 79, 80, 81, and 82; C.I. Solvent Reds 8, 35, 83, 84, 100, 109, 118, 119, 121, 122, and 160; and C.I. Solvent Blues 25, 55, and 70. However, the metal complex salt dyes being used in the present invention are not limited to them and also these dyes can be used as a combination thereof.

Also, the content of the metal-containing dye in the ink composition is preferably in the range of from 1 to 15% from the point of imparting a proper electrical conductivity to the ink.

As the solvent being used in the present invention, there are, for example, aliphatic alcohols such as methanol, ethanol, propanol, etc.; ketones such as dimethyl ketone, methyl ethyl ketone, etc.; glycols; glycol ethers; glycol esters; aromatic hydrocarbons; aliphatic hydrocarbons; amides; amino alcohols; and nitrogen-containing compounds such as morpholine, pyridine, etc., as the solvent for improving the solubility of the dye and the drying character of the ink, although the solvent for use in this invention is not limited to these solvents. Also, these dyes can be used as a combination of them. In particular, as the solvent for improving the solubility of the dye, the electric conductivity of the ink, and the drying character of the ink, a solvent containing methyl ethyl ketone, methanol, or ethanol is particularly preferred.

For improving the adhesion and the abrasion resistance at low temperature of the ink coats printed with the ink for a jet printer of the present invention, it is preferred to add to the ink a plasticizer such as a phthalic acid ester, a sebacic acid ester, a stearic acid ester, a phosphoric acid ester, a citric acid ester, an adipic acid ester, a maleic acid ester, a trimellitic acid ester, etc., each having a good compatibility with the resins being used in the present invention. Also, it is particularly preferred to add from 0.5 to 5% by weight at least a compound selected from a phthalic acid ester and a sebacic acid ester each having a good compatibility with the resins being used in this invention.

As practical examples of the foregoing phthalic acid ester, there are diethyl phthalate, dibutyl phthalate, and dioctyl phthalate and practical examples of the foregoing sebacic acid ester, there are diethyl sebacate, dibutyl sebacate, and dioctyl sebacate, although the invention is not limited to these compounds.

The ink for a jet printer according to the present invention can be printed on various recording materials such as a metal plate (e.g., aluminum, steel plate, stainless steel, tin plate, chromium plated steel), a glass plate, and a plastic plate (e.g., acrylic resin, nylon, polypropylene, vinyl chloride, polystyrene, polycarbonate, polyacetal, ABS). Among them, the metal plate is preferred. The ink for jet printer according to the present invention is preferably printed on a recording material coated with a wax or a recording material coated with a coating composition containing a wax.

The present invention is described more practically by the following examples, wherein all parts are by weight unless otherwise indicated.

EXAMPLE 1

| | |
|---|---|
| C.I. Solvent Black 27 | 8.0 parts |
| Joncryl 611 (trade name of styrene-acrylic copolymer resin, acid value 53, made by Johnson Polymer Co.) | 16.0 parts |
| YS Polystar T-130 (trade name of terpene-phenol copolymer resin, made by Yasuhara Chemical K.K.) | 7.0 parts |
| Dibutyl Sebacate | 2.0 parts |
| Methyl Ethyl Ketone | 56.0 parts |
| Methanol | 11.0 parts |

After sufficiently stirring the mixture of the foregoing components to form a solution, the resulting solution was filtered using a 0.5 μm membrane filter to provide an ink for a jet printer.

EXAMPLE 2

| | |
|---|---|
| C.I. Solvent Black 29 | 2.0 parts |
| C.I. Solvent Black 43 | 7.0 parts |
| Joncryl 611 (trade name of styrene-acrylic copolymer resin, acid value 53, made by Johnson Polymer Co.) | 24.0 parts |
| YS Polystar #2115 (trade name of terpene-phenol copolymer resin, made by Yasuhara Chemical K.K.) | 6.0 parts |
| Methyl Ethyl Ketone | 41.0 parts |
| Methanol | 15.0 parts |
| Ethanol | 5.0 parts |

After sufficiently stirring the mixture of the foregoing components to form a solution, the resulting solution was filtered using a 0.5 μm membrane filter to provide an ink for a jet printer.

EXAMPLE 3

| | |
|---|---|
| C.I. Solvent Black 27 | 4.0 parts |
| C.I. Solvent Black 29 | 1.0 part |
| Joncryl 586 (trade name of styrene-acrylic copolymer resin, acid value 105, made by Johnson Polymer Co.) | 20.0 parts |
| YS Polystar S-145 (trade name of terpene-phenol copolymer resin, made by Yasuhara Chemical K.K.) | 10.0 parts |
| Diethyl Sebacate | 1.0 part |
| Dibutyl Sebacate | 2.0 parts |
| Methyl Ethyl Ketone | 20.0 parts |
| Methanol | 20.0 parts |
| Ethanol | 22.0 parts |

After sufficiently stirring the mixture of the foregoing components to form a solution, the resulting solution was filtered using a 0.5 μm membrane filter to provide an ink for a jet printer.

EXAMPLE 4

| | |
|---|---|
| C.I. Solvent Black 27 | 5.0 parts |
| C.I. Solvent Black 43 | 5.0 parts |
| Joncryl 586 (trade name of styrene-acrylic copolymer resin, acid value 105, made by Johnson Polymer Co.) | 12.0 parts |
| YS Polystar T-130 (trade name of terpene-phenol copolymer resin, made by Yasuhara Chemical K.K.) | 12.0 parts |
| Dibutyl Phthalate | 1.0 part |
| Methyl Ethyl Ketone | 33.0 parts |
| Methanol | 32.0 parts |

After sufficiently stirring the mixture of the foregoing components to form a solution, the resulting solution was filtered using a 0.5 μm membrane filter to provide an ink for a jet printer.

EXAMPLE 5

| | |
|---|---|
| C.I. Solvent Red 122 | 10.0 parts |
| Joncryl 611 (trade name of styrene-acrylic copolymer resin, acid value 53, made by Johnson Polymer Co.) | 15.0 parts |
| YS Polystar T-130 (trade name of terpene-phenol copolymer resin, made by Yasuhara Chemical K.K.) | 6.0 parts |
| Dibutyl Phthalate | 3.0 parts |
| Methyl Ethyl Ketone | 50.0 parts |
| Methanol | 17.0 parts |

After sufficiently stirring the mixture of the foregoing components to form a solution, the resulting solution was filtered using a 0.5 μm membrane filter to provide an ink for a jet printer.

Each of the inks prepared in Examples 1 to 5 was printed on an aluminum plate coated with 1.0 mg/100 cm$^2$ of paraffin wax having a melting point of 60° C., a steel plate coated with an epoxy ester coating composition containing 3% microcrystalline wax having a melting point of 80° C., a glass sheet, a plastic plate (acrylic resin, nylon, or polypropylene), and a metal plate (aluminum, stainless steel, or tin plate) using a continuous ink jet printer "IJ Printer" (trade name, made by Hitachi, Ltd.). The results showed that in each case, a clear printed image having a sufficient spread of dot was obtained on the aluminum plate coated with the paraffin wax, the steel plate coated with the coating composition containing the microcrystalline wax, the glass sheet, the acrylic resin plate, the nylon plate, the polypropylene plate, the aluminum plate, the stainless steel plate, and tin plate, and also the jetting stability was good.

Next, an adhesive tape, "Cello Tape" (trade name, made by Nichiban Company, Limited) was stuck onto each printed image printed on each plate described above and then the adhesive tape was peeled off, whereby the adhesion of each printed image was evaluated. The results showed that each printed image had a good adhesion without being peeled off.

Next, when the abrasion of each printed image was evaluated by rubbing each printed image 10 times with an eraser, MONO (trade name, made by Tonbo Enpitsu K. K.), each image could be sufficiently read and had a good abrasion resistance.

COMPARATIVE EXAMPLE 1

| | |
|---|---|
| C.I. Solvent Black 27 | 8.0 parts |
| Joncryl 611 (trade name of styrene-acrylic copolymer resin, acid value 53, made by Johnson Polymer Co,) | 23.0 parts |
| Dibutyl Sebacate | 2.0 parts |
| Methyl Ethyl Ketone | 56.0 parts |
| Methanol | 11.0 parts |

After sufficiently stirring the mixture of the foregoing components which were a composition corresponding to the ink composition in Example 1 from which YS Polystar T-130 was removed to form a solution, the resulting solution was filtered using a 0.5 μm membrane filter to provide an ink for a jet printer.

This ink was printed on an aluminum plate coated with 1.0 mg/100 cm$^2$ of a paraffin wax having a melting point of 60° C. and also on a steel plate coated with an epoxy ester coating composition containing a 3% microcrystal wax having a melting point of 80° C. by the same manner as in Example 1.

The result showed that the spread of the ink dot to the aluminum plate coated with the paraffin wax and the steel plate coated with the coating composition containing the microcrystalline wax was insufficient and the printed image could not be easily read. Also, when the adhesion of the printed image was evaluated, the printed image was peeled off and became unreadable.

COMPARATIVE EXAMPLE 2

| | |
|---|---|
| C.I. Solvent Black 27 | 8.0 parts |
| YS Polystar T-130 (trade name of terpene-phenol series copolymer resin, made by Yasuhara Chemical K.K.) | 23.0 parts |
| Dibutyl Sebacate | 2.0 parts |
| Methyl Ethyl Ketone | 56.0 parts |
| Methanol | 11.0 parts |

After sufficiently stirring the mixture of the foregoing components which were a composition corresponding to the ink composition in Example 1 from which Joncryl 611 was removed to form a solution, the resulting solution was filtered using a 0.5 μm membrane filter to provide an ink for a jet printer.

This ink was printed on an aluminum plate coated with 1.0 mg/cm² of a paraffin wax having a melting point of 60° C., a steel plate coated with an epoxy ester coating composition containing a microcrystalline wax having a melting point of 80° C., a glass sheet, a plastic plate (acrylic resin, nylon, or polypropylene), and a metal plate (aluminum, stainless steel, or tin plate) by the same manner as in Example 1.

The results showed that a clear printed image having sufficient dot spreading was obtained on each of the aluminum plate coated with the paraffin wax, the steel plate coated with the coating composition containing the microcrystalline wax, the glass sheet, the acrylic resin plate, the nylon plate, the polypropylene plate, the aluminum plate, the stainless steel plate, and the tin plate.

Then, the adhesion and the abrasion resistance of each printed image on each plate was evaluated by the same manner as in Example 1. The results showed that each printed image had good adhesion and abrasion resistance to the aluminum plate coated with the paraffin wax and the steel plate coated with the coating composition containing the microcrystal wax but in the evaluation of the abrasion resistance to the glass sheet, the acrylic resin plate, the nylon plate, the polypropylene plate, the aluminum plate, the stainless steel plate, and the tin plate, the printed image was partially peeled off and the image could not be easily read.

COMPARATIVE EXAMPLE 3

| | |
|---|---|
| C.I. Solvent Black 27 | 8.0 parts |
| YS Polystar T-130 | 12.0 parts |
| Vinylite VMCC (trade name of vinyl chloride-vinyl acetate-maleic acid copolymer resin, made by Union Carbide Co.) | 6.0 parts |
| Dibutyl Sebacate | 2.0 parts |
| Methyl Ethyl Ketone | 60.0 parts |
| Methanol | 12.0 parts |

After sufficiently stirring the mixture of the foregoing components to form a solution, the resulting solution was filtered using a 0.5 μm membrane filter to provide an ink for a jet printer.

This ink was printed on an aluminum plate coated with 1.0 mg/cm² of a paraffin wax having a melting point of 60° C., a steel plate coated with an epoxy ester coating composition containing a 3% microcrystalline wax having a melting point of 80° C., a glass sheet, a plastic plate (acrylic resin, nylon, or polypropylene), and a metal plate (aluminum, stainless steel, or tin plate) by the same manner as in Example 1.

The results showed that spreading of the ink dot to aluminum plate coated with the paraffin wax, the steel plate coated with the coating composition containing the microcrystalline wax, the glass sheet, the acrylic resin plate, the nylon plate, the polypropylene plate, the aluminum plate, the stainless steel plate, and the tin plate was inferior to the cases in Example 1.

Next, the adhesion and the abrasion resistance of each printed image was evaluated by the same manner as in Example 1. The results showed that to the aluminum plate coated with the paraffin wax, the steel plate coated with the coating composition containing the microcrystalline wax, the glass sheet, the acrylic resin plate, the nylon plate, the polypropylene plate, the aluminum plate, the stainless steel plate and the tin plate, the printed image was partially peeled off and could not be easily read.

COMPARATIVE EXAMPLE 4

| | |
|---|---|
| C.I. Solvent Black 27 | 8.0 parts |
| YS Polystar T-130 | 16.0 parts |
| Epikote 1004 (trade name of epoxy resin, made by Shell Chemical K.K.) | 8.0 parts |
| Dibutyl Sebacate | 2.0 parts |
| Methyl Ethyl Ketone | 55.5 parts |
| Methanol | 10.5 parts |

After sufficiently stirring the mixture of the foregoing components to form a solution, the resulting solution was filtered using a 0.5 μm membrane filter to provide an ink for a jet printer.

This ink was printed on an aluminum plate coated with 1.0 mg/cm² of a paraffin wax having a melting point of 60° C., a steel plate coated with an epoxy ester coating composition containing a 3% microcrystalline wax having a melting point of 80° C., a glass sheet, a plastic plate (acrylic resin, nylon, or propylene), and a metal plate (aluminum, stainless steel, or tin plate).

The results showed that to the aluminum plate coated with the paraffin wax, the steel plate coated with the coating composition containing the microcrystalline wax, the glass sheet, the acrylic resin plate, and the nylon plate, the polypropylene plate, the aluminum plate, the stainless steel plate, and the tin plate, spreading of the ink dot was inferior to the cases in Example 1.

Next, the adhesion and the abrasion resistance of each of the printed images were evaluated by the same manners as in Example 1. The results showed that to the aluminum plate coated with the paraffin wax, the steel plate coated with the coating composition containing the microcrystalline wax, the glass sheet, the acrylic resin plate, the nylon plate, the polypropylene plate, the aluminum plate, the stainless steel plate, and the tin plate, the printed image was partially peeled off and could be easily read.

According to the present invention, by using a terpene-phenol copolymer resin and a styrene-acrylic copolymer resin together, an ink for jet printer showing an excellent jetting stability and capable of forming a printed image having an excellent adhesion and an excellent abrasion resistance to a recording material attached with a wax, a recording material coated with a coating composition containing a wax, and other various recording materials such as glass, plastics, metals, etc., can be obtained.

Furthermore, by using a metal complex salt dye as a dye component, a proper electric conductivity can be imparted to the ink without reducing the excellent adhesion and the excellent abrasion resistance of the printed image.

While the invention has been described in detail and with reference to specific examples thereof, it will be apparent to one skilled in the art that various changes and modifications can be made therein without departing from the spirit and scope thereof.

What is claimed is:

1. An ink having excellent jetting stability for a jet printer containing an oil soluble dye, a synthetic resin, and an organic solvent, wherein said synthetic resin contains a terpene-phenol copolymer resin having a good compatibility with wax and a styrene-acrylic copolymer resin, wherein the acid value of said styrene-acrylic copolymer resin is not higher than 120.

2. The ink for a jet printer as claimed in claim 1, wherein the weight ratio of the terpene-phenol copolymer resin to the styrene-acrylic copolymer resin is from 1/10 to 1/1.

3. The ink for a jet printer as claimed in claim 1, wherein the weight average molecular weight of the terpene-phenol copolymer resin is from 500 to 1,000.

4. The ink for a jet printer as claimed in claim 1, wherein the weight average molecular weight of the styrene-acrylic copolymer resin is from 3,000 to 30,000.

5. The ink for a jet printer as claimed in claim 1, wherein the oil soluble dye is a metal complex salt dye.

6. The ink for a jet printer as claimed in claim 1, wherein said organic solvent is selected from the group consisting of methyl ethyl ketone, methanol, and ethanol.

7. The ink for a jet printer as claimed in claim 1, which is printed on a recording material coated with a wax.

8. The ink for a jet printer as claimed in claim 7, wherein said recording material is selected from the group consisting of an aluminum plate, a steel plate, and a tin plate.

9. The ink for a jet printer as claimed in claim 1, which is printed on a recording material coated with a coating composition containing a wax.

10. The ink for a jet printer as claimed in claim 9, wherein said recording material is selected from the group consisting of an aluminum plate, a steel plate, and a tin plate.

* * * * *